Patented Sept. 15, 1942

2,296,108

UNITED STATES PATENT OFFICE 2,296,108

ALUMINUM ACETATE-CASEIN COMPLEX AND METHOD OF MAKING

Walter B. Kinney, Bainbridge, N. Y., assignor to The Borden Company, New York, N. Y., a corporation of New Jersey No Drawing. Application July 2, 1941, Serial No. 400,857

6 Claims. (Cl. 260—119)

This invention relates to the production of a liquid aluminum acetate-casein complex and it comprises the mode of manufacture of this aluminum acetate-casein complex and the new and unique products themselves.

Aluminum salts such as aluminum acetate or aluminum formate have been proposed in the past as insolubilizing materials for casein coatings and sizes containing solubilized casein. In other words, treatment of fabrics sized with casein solutions, with aluminum salt solutions, caused insolubilization of the casein sizing, making the same more resistant to the action of water. Since the addition of these aluminum salts caused the casein to be precipitated from solution it was necessary to resort to the use of a separate bath for treating the sized fabrics. Solutions containing these aluminum salts were used to harden casein sizes and coatings. In general, aluminum acetate was preferred, as the insolubilizing bath, to aluminum formate, since less heating is required in order to obtain the beneficial water-resistant and water-repellent effects obtained by the use of the aluminum salt.

The principal object of my invention is the preparation of a liquid aluminum acetate-casein complex which is suitable for producing a sizing or coating on textiles, paper, leather, etc., to be applied as one bath, which sizing or coating will display exceptionally good water resistance and water repellancy. The water repellancy is especially good when waxes, resins, gums, and the like, are added to and used with solutions or emulsions of this aluminum acetate-casein complex.

A further object of this invention is to provide a rapid and efficient method of manufacture of liquid aluminum salt-casein complex by the use of pressure in conjunction with heat, the treatment being preferably carried out at above 212° F., under pressure.

In accordance with this invention I have found that soluble aluminum acetate will react with casein when in the presence of water to form a liquid aluminum acetate-casein complex. Furthermore, this aluminum acetate-casein complex has properties which make it particularly suitable as a sizing or coating on textiles, paper, and leather which are desired to have exceptional water resistance or water repellancy. Also, this liquid aluminum acetate-casein complex has a desirable light color and exceptional stability in that there is little tendency for hydrolysis or change in viscosity of the liquid product to take place during storage. Further, it has a pH below the isoelectric point of casein, being approximately 4.0, so that additional aluminum acetate or aluminum formate may be added to it to increase the water resistance, if desired. Also, the liquid aluminum acetate-casein complex can be used as an emulsifying material for waxes, resins, etc., to produce wax or resin emulsions which will impart exceptional water-repellent properties to textiles when used in finishes.

I am aware of the fact that it has previously been proposed to prepare casein-aluminum formate solution as is described in U. S. Patent 2,057,675, wherein 3 parts of aluminum formate—and 7 parts of casein—are milled together, thereafter sufficient water is added to produce a solution of from 10% to 15% solids content and that such product may be used as a suitable material for the sizing of cloth, etc. I am also aware of U. S. Patent 2,057,960 whereby a casein-aluminum formate solution may be improved in water repellancy with wax. I make no claim to these inventions.

In order to fully disclose my invention I give the following examples as illustrative of suitable methods for carrying out the process of the invention and for preparing products of it. In these examples, all parts are by weight.

EXAMPLE I 15 parts of regular acid casein, such as lactic, hydrochloric, or sulphuric acid casein in the dry state, preferably ground to 80 mesh and preferably having the fines which pass through a 100 mesh screen removed, are mixed with 5 parts of soluble aluminum acetate. This simple mixture is added to 180 parts of cold water which has been placed in a steam jacketed pressure kettle equipped with a stirring device. The mixture is heated with constant stirring, using from 10 to 20 pounds pressure in the kettle (these pressures represent temperatures of 239.4 and 258.7° F. respectively). The heating and stirring is continued until a complete solution is obtained which will result within 30 to 60 minutes. The resulting solution is quite thin and non-viscous while warm, though after cooling it becomes a soft solid jell.

EXAMPLE II 15 parts of dry acid casein, such as lactic, hydrochloric, or sulphuric acid casein, preferably ground to 80 mesh and having the fines which pass through a 100 mesh screen removed, are mixed with 25 parts of a 20% solution of aluminum acetate. This mixture is added to 160 parts of cold water. The mixture is then heated with continuous stirring to a temperature of 180°

F., and the heating and stirring continued for several hours until a perfect solution is obtained. The resulting aluminum-acetate-casein complex will be a thin liquid while warm, though on cooling will form a soft solid jell. The product will have the same properties (with the exception of a somewhat darker color), as that formed according to the method used in Example I, in which the pressure was used to reduce the time of preparing it.

EXAMPLE III 15 parts of acid casein, such as lactic, hydrochloric, or sulphuric acid casein, preferably ground to 80 mesh and having the fines which pass through a 100 mesh screen removed, are mixed with 15 parts of soluble aluminum acetate. This mixture is added to 180 parts of cold water. The process is conducted as in Example I.

EXAMPLE IV 15 parts of regular casein, such as lactic, hydrochloric or sulphuric acid casein, preferably ground to 80 mesh and having the fines which pass through a 100 mesh screen removed, are mixed with 20 parts of a 24% basic aluminum acetate solution. This mixture is added to 80 parts of cold water. Proceed as in Example I.

In the process, it is not necessary to remove the fines passing a 100 mesh screen, but if the fines are not sifted out, the dissolving operation is considerably slower.

I have found that the use of a pressure kettle in order to obtain higher temperatures than can be obtained by heating the aqueous mixture of casein and aluminum acetate at atmospheric pressures, results in a very great saving of time in preparing the solution. Another advantage of using the pressure is that the product formed is of slightly better color (lighter color) than when the longer cooking at low temperatures is resorted to. The pressures used in Example I are only illustrative, and higher or lower pressures could also be used. Basic aluminum acetate must be used in order to form the liquid aluminum acetate-casein complex, though once the complex is formed, solutions of aluminum acetates, basic or not basic, or other aluminum salts may be added without precipitating the casein. The amount of aluminum acetate that may be used to form the complex may be varied considerably, as little as 20 parts of basic aluminum acetate and as much as 150 parts of basic aluminum acetate may be used with each 100 parts by weight of casein.

The better water resistance of the products of my invention are shown by the results of tests made comparing a product of Example I with an aluminum formate-casein complex made by the process described under U. S. Patent 2,057,675. In these tests, each of these products was diluted with warm water to 5% solids content and then warmed to 160° F. and 1 part by weight of 40% formaldehyde was added for each 100 parts of the diluted complex. This addition of formaldehyde did not appear to cause any coagulation. A strip of cotton cheesecloth of 44×40 construction, was padded using each product, following which it was immediately run through squeeze rolls according to the customary procedure of the textile industry, to squeeze out the excess of solution, and subsequently dried on a drying cylinder. The sized textiles were then air-conditioned, and tested for stiffness according to the Peirce hanging loop (heart loop) test (American Dyestuff Reporter, March 20, 1939, page 138, November 27, 1939, page 688, Textile Research, volume 9, No. 6, pages 216–30, 1939). The sized cotton cloths were then washed in ½% soap solution at 100° F. for one-half hour, rinsed in lukewarm water, dried and ironed, and again tested for stiffness according to the Peirce hanging loop method. In Table I are shown the stiffness values obtained in these tests as well as the stiffness of unsized cloth. This test is a measure of the water resistance of the sizing, as the less sizing that is washed off of the sample during the washing, the stiffer the textile will be after the washing, and consequently the better the water or wash resistance of the sizing. (In Tables I and II the higher numbers correspond to greater stiffness).

TABLE I (With formaldehyde)

| | Unsized cloth | Cloth sized with product of Example 1 and formaldehyde | Cloth sized with casein-aluminum formate complex and formaldehyde |
|---|---|---|---|
| Stiffness: | Centimeters | | |
| Before washing | 1.38 | 3.82 | 3.91 |
| Following washing | 1.38 | 2.86 | 1.40 |

Another pair of comparative tests were made, wholly similar to the above, but with the omission of the formaldehyde. The results of these tests are given in Table II below. It will be observed that the results are quite similar to those given above.

TABLE II (Without formaldehyde)

| | Unsized cloth | Cloth sized with product of Example 1 | Cloth sized with casein-aluminum formate complex |
|---|---|---|---|
| Stiffness: | Centimeters | | |
| Before washing | 1.38 | 3.90 | 3.71 |
| Following washing | 1.38 | 2.62 | 1.40 |

These tests clearly indicate that the liquid aluminum acetate-casein complex of my invention forms sizings of very much more water or wash resistance than an aluminum formate-casein complex purchased on the market, as the stiffness values indicate that the latter was almost completely washed out during this washing test. Tests made without the addition of formaldehyde to the complexes before padding the cloths gave results almost identical with those shown in Table I.

The great advantage of fastness to washing, shown by the aluminum-acetate complex over the aluminum formate-casein complex (whether formaldehyde is used or not) is very surprising, and I do not attempt to explain the reasons for this.

A further advantage of the aluminum acetate-casein complex is the fact that it will keep, after opening, (without preservatives added) for a considerable time (i. e. for several months), without molding, whereas the formate product is subject to molding. The acetate complex can be kept (in sealed containers) for a period of some months, at least, (samples have been kept over a year) without becoming putrid. This latter is rather surprising since it is well known that casein solutions in alkali (e. g. liquid casein glues) would become putrid in a few days. Hence it is quite feasible to make the aluminum acetate-casein complex (soft jelly-like material) at the factory and ship this to the paper-coating mill or to the fabric-sizing plant, etc. (the customer) and the latter can use this for days or even weeks, after opening the containers.

The jelly-like material can be warmed to say 160° F. to liquefy same, and then diluted with water or mixed with other liquid materials.

The excellent water-repellent properties obtainable with the products of my invention when used as an emulsifier for wax, such as paraffin wax, are shown by the following tests in which a product of Example No. 1 was again compared with an aluminum formate-casein complex purchased on the market and said to have been made by the process described under U. S. Patent 2,057,675. In these tests, 3 parts of paraffin wax were melted and then added with rapid mixing to 10 parts by weight of product of Example No. 1, which had previously been heated to 160° F. The mixture was passed through a colloid mill in order to produce a more stable emulsion (it is not always necessary to use a colloid mill, and if desired auxiliary emulsifying materials may be added, though they are not necessary as indicated by this test). This emulsion contains 3 parts of paraffin wax to 1 part of aluminum acetate-casein complex solids. A similar wax emulsion was prepared using the aluminum formate-casein complex. Each emulsion was then diluted with water to reduce the total solids to 5%. The cloth was then padded with each of these emulsions as described in the previous test, passed between squeeze rolls, dried, and air-conditioned as in the previous tests. They were then compared for water-repellency according to a modified hydrostatic pressure test of the AATCC (Textile Testing by J. H. Skinkle, page 77, Chemical Publishing Company, New York, N. Y., 1940). This test consists of measuring the pressure that the sized cloth will stand, as indicated by the height of water that can be built up in a graduated cylinder held tightly against its surface, before the water penetrates through the treated cloth. The results of these tests are shown in Table III.

TABLE III

|  | Unsized cloth | Cloth sized with product of Example I plus wax | Cloth sized with casein-aluminum formate complex and wax |
|---|---|---|---|
| Height of water in cm.. | Less than 1.. | 42 | 36 |

The better water repellancy of a fabric sized with wax emulsion made with a product of this invention as compared with an aluminum formate-casein complex obtainable on the market is clearly evident from the considerably larger pressure that was required before the water penetrated into the treated cloths.

The products of my invention are also satisfactory as emulsifying materials to form resin emulsions which will have good water-resistant properties. As an example of the use of the product of this invention I give the following:

To 1816 parts of the product described in Example I, which has been heated to 160° F., 272 parts of an alkyd resin (such as Rezyl 880), which has been liquefied by heating to 160° F., was added and the mixture rapidly stirred and then passed through a colloid mill. A smooth emulsion which forms coatings of good water resistance is thereby obtained.

This example is given only by way of illustration, and other resins, with or without solvents or plasticizers, and other proportions of resin to casein complex have been found to be satisfactory. As examples of other resins which may be used satisfactorily I mentioned alkyd, urea-formaldehyde, melamine formaldehyde, vinyl, terpene, cumarone-indene, ester gum, and rosin.

Fats or fatty oils such as linseed, castor, cottonseed, corn, coconut, palm, fish and mineral oils, as well as tallow wool fat, and Japan wax, may be emulsified with this aluminum acetate-casein complex to produce emulsions of interesting properties. Waxes other than paraffin wax, such as carnauba, candelilla, or petroleum waxes, may be used satisfactorily.

In the above description I have referred to basic aluminum acetate as being used. The acetate should be a basic aluminum acetate which is soluble in water and the acetate should be one that contains more than two acetic acid radicals to each aluminum atom, i. e. less basic than the $AlOH(C_2H_3O_2)_2$ and a 5% solution of the acetate should have a pH below 5, but not below 3.3. Basic aluminum acetates, the 5% solutions of which have a pH between 3.5 and 4.7 are preferred.

It has been shown above that the aluminum acetate-casein complex, made according to the present invention gives sizings much more fast than the aluminum formate complex of the prior art, which is obviously a very great advantage. Another difference is the fact that of solutions of the same solids content, the acetate complex has a slightly greater body. A further advantage resides in the fact that aluminum acetate is cheaper than the formate.

Of the different commercial caseins, that precipitated by hydrochloric acid is somewhat better than casein precipitated by sulphuric or lactic acid. Rennet casein has not given satisfactory products.

In the process of the present case, it is not necessary to finely grind the casein and the aluminum compound together. This makes the process somewhat simpler than the process of Patent 2,057,675. In fact tests have shown that while a mixture of the acetate and casein, ground together to a fine flour, can be dissolved, its dissolves more slowly than the granular materials as given in the examples.

I claim:

1. A water soluble complex of casein with water soluble basic aluminum acetate, which material when applied as a sizing upon textiles, paper, leather and the like, and dried, produces a dressing that is substantially fast to laundering.

2. A complex of acid-precipitated casein with a water soluble basic aluminum acetate which is soluble in water, the aluminum acetate component being one that dissolved in water as a 5% solution, gives a pH of between 3 and 5, such complex when applied to textiles, paper, leather and the like and dried, being substantially fast to laundering and said complex containing per 100 parts of casein, between 20 and 150 parts of basic aluminum acetate.

3. A process which comprises incorporating casein with water-soluble basic aluminum acetate and water, agitating the mixture and heating sufficiently to form a solution.

4. A process which comprises mixing dry granular acid-precipitated casein and water soluble basic aluminum acetate and water, and heating the mixture under pressure to above 212° F., until dissolved.

5. A process as in claim 4, in which the basic aluminum acetate is one that when dissolved in 19 times its own weight of water, gives a solution having a pH between 3 and 5.

6. A process as in claim 3, in which for 100 parts of casein, the amount of aluminum acetate is between 20 and 150.

WALTER B. KINNEY.